B. M. LINCOLN.
AUTOMATICALLY CONTROLLING HEADLIGHTS FOR VEHICLES.
APPLICATION FILED JAN. 3, 1910.
1,002,924. Patented Sept. 12, 1911.
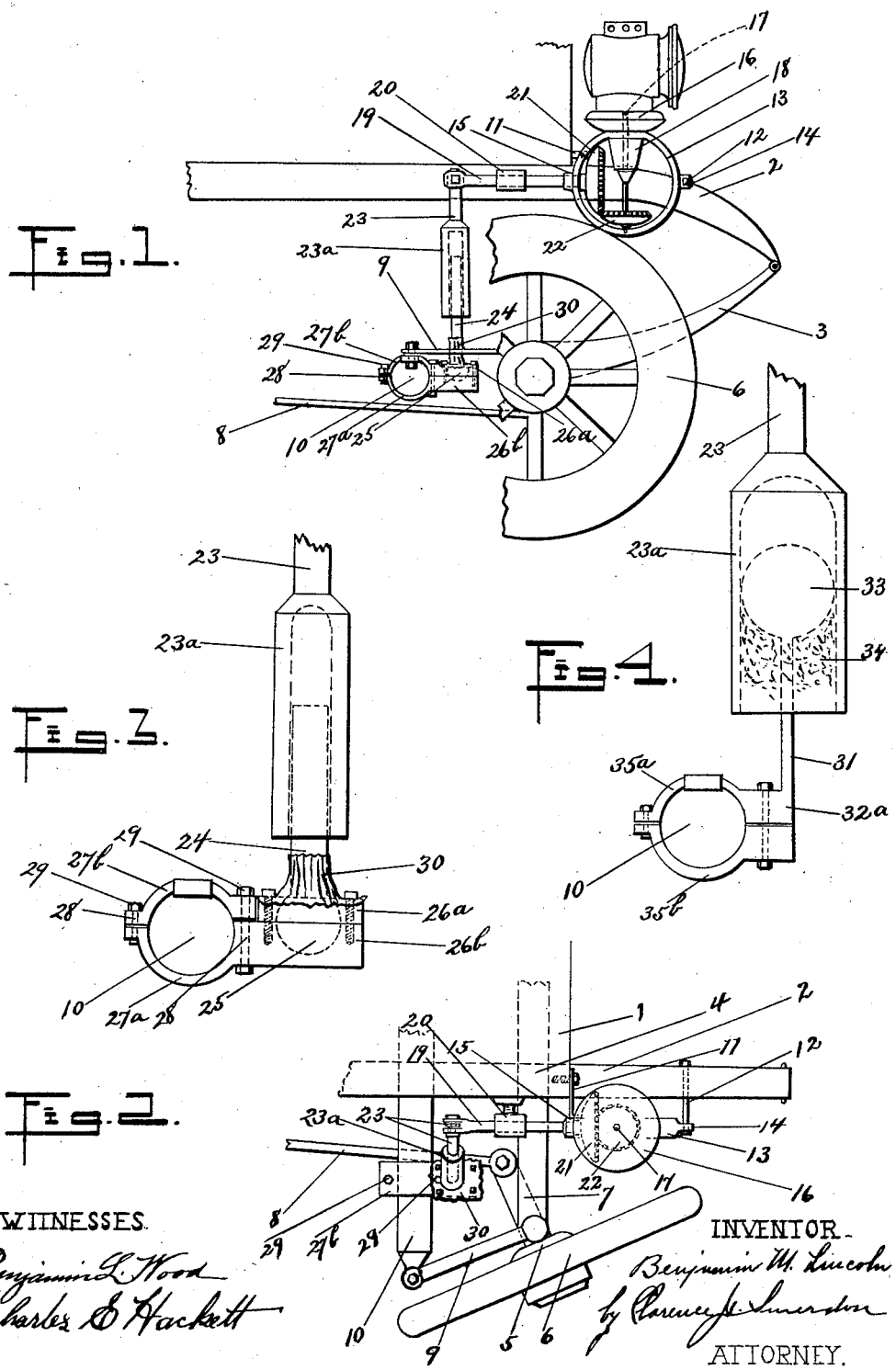

UNITED STATES PATENT OFFICE.

BENJAMIN M. LINCOLN, OF NORTON, MASSACHUSETTS.

AUTOMATICALLY CONTROLLING HEADLIGHTS FOR VEHICLES.

1,002,924.     Specification of Letters Patent.     Patented Sept. 12, 1911.

Application filed January 3, 1910. Serial No. 536,100.

*To all whom it may concern:*

Be it known that I, BENJAMIN M. LINCOLN, a citizen of the United States, and a resident of Norton, in the county of Bristol and Commonwealth of Massachusetts, have invented a new and useful Improvement in Devices for Automatically Controlling Headlights for Vehicles, of which the following is a full, clear, and exact description.

The purpose of this invention is to provide automatic means for controlling the headlights on automobiles or other vehicles, which will turn the lamps so as to throw their rays constantly in the direction of the vehicle's progressive movement, and thus illuminate the roadway in front of the same.

The invention consists in the construction and skilful combination of selected parts, whereby an automatic device for accomplishing the desired end is provided that fulfils the exacting requirements of such a mechanism when used on an automobile,— to wit, that it shall be simple in construction and operation, consisting of few parts and compact, dustproof, free from rattle, and easily adjusted to every make and style of car.

In the following description, reference is to be made to the drawings filed herewith and forming a part of this specification, in which similar characters of reference indicate corresponding parts in all the figures.

Figure 1 represents a side elevation of my invention as applied to the forward part of an automobile body, parts of said automobile being cut away; Fig. 2 is a top plan view of my invention as it would appear when the front wheels of the automobile are partly turned; Fig. 3 is an enlarged side elevation of the lower part of my invention as shown in Fig. 1; and Fig. 4 is an enlarged side elevation of a modified lower part of my invention.

Referring to the drawings, 1 represents a front corner of the body of an automobile, and 2 is the frame of the chassis, extending forward beyond the body 1. To the extremity of 2 is pivotally joined the end of a spring 3, said spring being fastened in the usual way to the axle 4, to the end of which is pivotally joined a stub axle 5, on which the wheel 6 revolves. Stub axle 5 has an inwardly extending prolongation 7, to the inner end of which is pivotally joined the steering-rod 8, which has given it, as desired, a backward or forward motion parallel with the longitudinal axis of the automobile. One end of a link 9 is rigidly joined to stub axle 5 at a point directly above its pivotal connection to axle 4 and the other end of link 9 is pivotally joined to a link-bar 10 which extends under the automobile body at approximately right angles to its length. To the frame 2 by means of a brace 11 and bolts 12 is fastened an approximately circular frame 13, having on its forward part a flange 14 through which one of bolts 12 extends, and having on its rear part a tubular extension 15. See Figs. 1 and 2. The top of frame 13 is carried upward and widened out so as to form a level, circular table 16 upon which a corresponding table or bearing, (not shown) attached to the bottom of the headlight (not shown) will revolve and thus, by means of their broad surfaces, prevent wabbling of the headlight upon the spindle 17, the lower end of which is pivotally mounted in the bottom of frame 13 and which extends up through a cylindrical hole in frame 13 a sufficient distance above table 16 to permit the mounting of a headlight on said spindle. There is also a downward projection 18 of frame 13 below table 16, thus lengthening the cylindrical hole in which spindle 17 will revolve, and thus securing a broad bearing surface for said spindle, which will further prevent any tendency to horizontal motion or wabbling of the top of spindle 17, whereon the headlight is mounted. A cylindrical rod 19 is revolubly mounted in tubular extension 15 and in a bracket 20 bolted to the side of the body 1. Upon rod 19 and spindle 17 are mounted bevel gears 21 and 22 respectively, as shown, intermeshing with each other, so that the revolution of rod 19 produces revolution of spindle 17. The end of rod 19 is forked, the slot therein being vertical, and snugly fitting said slot is the upper end of member 23, pivotally joined therein. The lower part of member 23 is a tube 23$^a$, closed at the top but open at the bottom. An upright rod 24 is slidably mounted within tube 23$^a$, and has at its lower extremity a ball 25 which forms part of a ball and socket joint, the socket being two blocks 26$^a$ and 26$^b$ clamped together which have their lower and upper surfaces respectively milled out to correspond with the contour of the ball 25, and a hole being provided through the top of block 26ᵃ sufficiently large to allow rod 24 to turn upon ball 25 as a pivot. Block 26ᵇ has a rearwardly extending flange 27ᵃ approximately semi-circular in cross-section adapted to form one half of a clamp which may embrace rod 10, the other half of said clamp consisting of a second approximately semi-circular piece 27ᵇ, 27ᵃ and 27ᵇ being tightly bound upon rod 10 by means of bolts 28 and nuts 29. A piece of sheet rubber 30 or similar material is bound around the lower part of rod 24 and fastened in any convenient manner over the top of block 26ᵃ in such manner as to keep dust from penetrating the ball and socket joint formed by members 25, 26ᵃ, and 26ᵇ.

A different construction is shown in Fig. 4, where member 23 corresponds with the same member in Figs. 1, 2, and 3, but the tube 23ᵃ in the construction illustrated by Fig. 4 is of much greater diameter than in the former construction. A rod 31 is rigidly fastened to the top of a block 32ᵃ and has at its top a ball 33 of such diameter as to exactly fit the inside of tube 23ᵃ, thus forming a universal and slidable connection between members 23ᵃ and 31. The diameter of tube 23ᵃ may be of such size as to allow the desired lateral movement of the bottom of rod 31. Packing soaked in oil 34 is placed around ball 33 to serve simultaneously as an oiler and dust protector. Block 32ᵃ has a flange 35ᵃ similar to flange 27ᵇ in Fig. 3 and for the same purpose, while member 35ᵇ corresponds with 27ᵃ in Fig. 3, forming the lower half of the clamp around rod 10. It will be readily understood that as rod 10 is moved transversely to the length of the car, the lower end of rod 24 (or 31 in Fig. 4) will be carried with it, away from or toward the body 1. Therefore, inasmuch as the top of rod 23 is held at a fixed distance from body 1, being secured to the end of rod 19, and since there is no pivotal connection (referring to Fig. 1) between the upper end of rod 23 and the lower end of piston rod 24, said rod 24 will turn pivotally upon its ball 25 in its socket, and will also turn revolubly in said socket to a small extent, because there is a slight motion of bar 10 lengthwise of the car simultaneously with its transverse motion. There is also a slight pivotal motion of rod 24 upon ball 25 parallel to the length of the car. It is evident, therefore, that a ball and socket joint is necessary to provide for the triple motion above explained. Since the top of rod 23 is pivoted to swing in parallelism with the length of the car only, as the bottom of piston 24 moves transversely thereto, rod 19 will be caused to revolve in its bearings, bracket 20 and extension 15, which revolving motion is transmitted by means of the bevel gears, 21 and 22, to the lamp spindle 17, thus causing the lamp to revolve simultaneously with the movements of the steering mechanism and the forward wheels.

Referring now to Fig. 4, as the lower end of rod 31 follows the motion of rod 10, as explained above in relation to Fig. 1, the upper end thereof, carrying the ball 33, has identically the same movements because rigidly attached thereto, and transmits its motion to the cylinder 23ᵃ. The triple motion, above explained, is provided for by the ball and socket joint consisting of ball 33 and cylinder 23ᵃ.

As the car body 1 rises and falls upon springs 3, the piston rods 24 in Figs. 1, 2, and 3 and 31 in Fig. 4 work in their cylinders 23ᵃ, thus taking up the vertical motion of the car body relative to the running gear.

It is clear from the foregoing description that all the oscillation and jar of the running gear relative to the car body is eliminated by means of my invention before it reaches rod 19, and only the twisting motion of the steering apparatus is imparted to rod 19 and therethrough to the lamp spindle 17. The construction, moreover, is simple and compact, consisting of few parts, and those so articulated as to be free from annoying rattle.

Having now fully described my invention, what I claim as new and desire to secure by Letters Patent, is,—

1. In combination in a vehicle, an axle, a body member yieldingly supported thereon, a rod supported independently of said body member and capable of motion longitudinally transverse to said body member, an upright rod connected by a universal joint to said transverse rod and having its upper end slidably mounted in a third rod, a revoluble rod supported upon said body member and pivotally jointed to said third rod, a lamp spindle supported on said body member, and means for transmitting the revolving motion of said revoluble rod to said lamp spindle.

2. In combination in a vehicle, an axle, a body member supported upon said axle and capable of motion toward and away from said axle, a stub axle pivotally jointed to said axle, a rod pivotally connected with said stub axle and capable of longitudinal motion transverse to said body member, a revoluble rod parallel to said body member and supported thereon, means for transforming the transverse motion of said first-mentioned rod into a revolving motion of said revoluble rod, a lamp spindle supported upon said body member, and means for transmitting said revolving motion of said revoluble rod to said lamp spindle.

3. In combination in a vehicle, a body member, a rod supported independently of said body member and capable of motion in every direction relatively to said body member, a revoluble rod supported upon said body member, means connecting said rods for transforming the motion of said first-mentioned rod into revoluble motion in said last-mentioned rod, a lamp spindle revolubly supported on said body member, and means for transmitting said revoluble motion of said revoluble rod to said lamp spindle.

BENJAMIN M. LINCOLN.

Witnesses:
CLARENCE J. SMERDON,
FRANK P. SMERDON.

Copies of this patent may be obtained for five cents each, by addressing the "Commissioner of Patents, Washington, D. C."